Nov. 12, 1963  G. F. DAVEY  3,110,103

METHOD OF WELDING

Filed Feb. 28, 1961

INVENTOR.
Gerald F. Davey
BY
Attorney

United States Patent Office 3,110,103
Patented Nov. 12, 1963

3,110,103
METHOD OF WELDING
Gerald F. Davey, Holden, Mass., assignor to Riley Stoker Corporation, Worcester, Mass., a corporation of Massachusetts
Filed Feb. 28, 1961, Ser. No. 92,241
2 Claims. (Cl. 29—491)

This invention relates to a method of welding and more particularly to a process for fastening together the edges of metallic plates by fusion.

In the welding of metallic plates and particularly in the welding together of tubing and pipes, it is the usual practice to place the edges together and to weld from one side of the joint. It is common to use a backing member to prevent the molten weld metal from flowing between the edges and forming a grape-like formation on the opposite side of the weld. Such a formation of weld metal would have to be ground away and would add another step to the welding process and increase its cost. However, backing members made of metal are expensive and, in the case of the welding of tubes, either the backing ring must be left inside the tube where it constitutes a restriction to the flow of liquid or it must be ground away, something that is quite difficult to do when the tubes are very long. The problem is particularly great in the case of boiler tubes where a great many tubes are welded together in the field and the lengths are very long, making the interior of the tube quite inaccessible. Furthermore, at high pressure boiler operation any resistance in the tubes subtracts from the energy in the fluid flow that is available to promote circulation. These and other difficulties experienced in the past with prior art methods have been obviated in a novel manner by the present invention.

It is, therefore, an outstanding object of the invention to provide a welding method wherein a smooth bead of weld metal is formed on the side of the joint opposite the welding operation.

Another object of this invention is the provision of a welding method in which the backing member is very inexpensive.

A further object of the present invention is the provision of a method of welding in which it is not necessary to grind or otherwise remove a protuberance caused by a backing member after the welding operation is over.

It is another object of the instant invention to provide a backing ring for tubes which is self-removing.

With these and other objects in view, as will be apparent to those skilled in the art, the invention resides in the combination of parts set forth in the specification and covered by the claims appended thereto.

Figure 1:
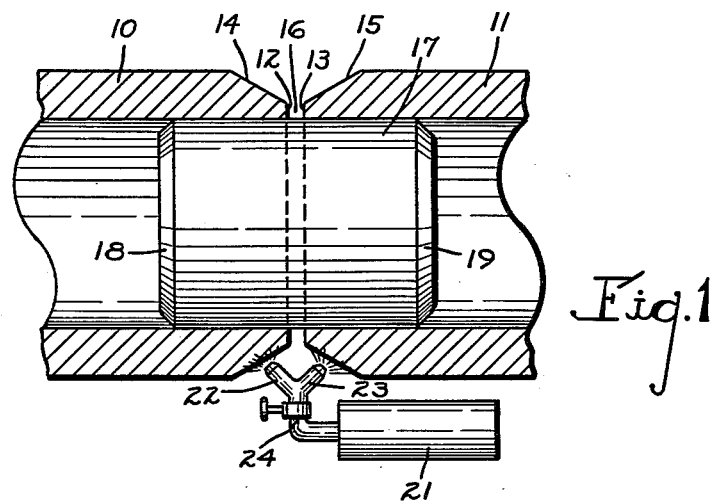
Figure 2:
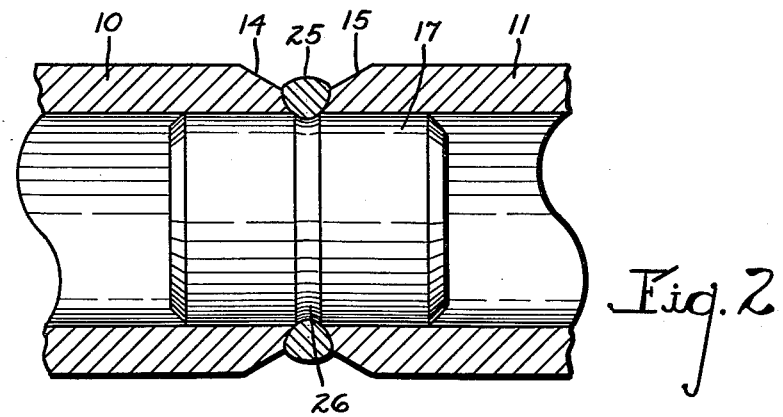

The character of the invention, however, may be best understood by reference to certain of its structural forms, as illustrated by the accompanying drawings in which:

FIG. 1 is a sectional view of a step in the method embodying the principles of the present invention, and FIG. 2 is a further step in the method.

Referring to FIG. 1, the ends of two tubes 10 and 11 are brought into axial alignment with their edges 12 and 13, respectively, slightly spaced by an amount in the order of 1/16 inch to provide a gap 16. Prior to the tubes being brought into the illustrated position, the edges 12 and 13 are provided with outer bevels 14 and 15. Within the tubes is inserted a backing member 17 in the form of a short, circular cylinder and whose end edges are provided with bevels 18 and 19; preferably the backing member is placed first in the tube 10 and the tube 11 is then inserted over the protruding end. The backing member is made of ice which, in the preferred embodiment, is frozen carbon dioxide ice; it, however, may be made of water ice, if so desired. Then a carbon dioxide cylinder 21 is brought to the area and its nozzles 22 and 23 are directed toward the bevels 14 and 15, respectively. A valve 24 controls the flow of carbon dioxide in the cylinder through the nozzles 22 and 23. Release of the carbon dioxide and its expansion causes the resultant gas to be very cold. The cold gas impinging against the bevels 14 and 15 chills the edges 12 and 13 of the tubes 10 and 11.

Referring to FIG. 2, the welder approaches the outside of the tubes and lays a bead 25 of weld metal between the edges 12 and 13 and along the bevels 14 and 15 in the conventional manner. The body of weld metal that is formed not only comes from the welding rod but also from the edges of the tube; a portion of the edges 12 and 13 are melted and flow into the body of the weld metal. This weld metal falls downwardly through the gap 16. Preferably, when welding takes place, the tube is held in the position shown in FIG. 2 and is rotated so that the welding takes place downwardly into the gap 16 between the edges of the tubes. In any case, weld metal flows through the gap 16 and strikes the backing member 17. The bead 25 being molten metal, it instantly begins to melt the backing member and a groove 26 is immediately formed. However, the contact of the hot metal with the ice of the backing member instantly chills it and prevents further flow of metal through the gap. The cold metal thus formed provides a support for the rest of the weld metal. Furthermore, the groove 26 is smooth and round, thus causing the formation of a bead on the inside of the joint which is also smooth and round and presents no appreciable obstructions to the flow of fluid. In the case of boiler tubes, where it is difficult to obtain access to the interior of the tubes to grind off the bead, the fact that no grape-like depending festoons of weld metal are formed on the interior is a beneficial aspect of the invention. Furthermore, no metallic welding ring is left on the inside of the tube to act as a restriction or to require removal. The backing member 17 is left within the welded tube and eventually it will melt. If, as in the preferred embodiment, the backing member is formed of solid carbon dioxide, it will pass from the solid state to the gaseous state by sublimation and the carbon dioxide gas will disappear into the atmosphere. In the case of water ice, the water left behind is no problem, since the boiler tube will be filled with water eventually, anyway.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A method of welding two steel tubes, comprising the steps of
 (a) beveling the corners formed between the end surfaces and the outer surfaces of the tubes,
 (b) placing a backing member, consisting of a cylindrical plug formed of ice having a diameter substantially equal to the internal diameter of the tubes, within the adjacent ends of the tubes with the tubes in alignment and the end surfaces slightly spaced,
 (c) laying weld metal between the edges from the outside of the tubes before appreciable melting of the ice takes place, and
 (d) permitting the backing member to melt completely.

2. A method of welding two steel tubes, comprising the steps of
 (a) beveling the corners formed between the end surfaces and the outer surfaces of the tubes,
 (b) placing a backing member, consisting of a cylindrical plug formed of carbon dioxide ice having a diameter substantially equal to the internal diameter of the tubes, within the adjacent ends of the tubes with the tubes in alignment and the end surfaces slightly spaced, (c) chilling the said edges, (d) laying weld metal between the edges from the outside of the tubes before appreciable melting of the ice takes place, and (e) permitting the backing member to melt completely.

References Cited in the file of this patent

UNITED STATES PATENTS

| | | |
|---|---|---|
| 1,372,805 | Fay | Mar. 29, 1921 |
| 1,435,919 | Fay | Nov. 21, 1922 |
| 1,806,949 | Palm | May 26, 1931 |
| 1,844,263 | Priebe | Feb. 9, 1932 |
| 1,969,840 | Goddard | Aug. 14, 1934 |
| 2,280,150 | Hasse et al. | Apr. 21, 1942 |
| 2,497,629 | Rieppel | Feb. 14, 1950 |
| 2,623,148 | Ronay | Dec. 23, 1952 |
| 2,820,427 | Chyle et al. | Jan. 21, 1958 |
| 2,862,294 | Philip | Dec. 2, 1958 |

FOREIGN PATENTS

| | | |
|---|---|---|
| 487,598 | Canada | Oct. 28, 1952 |